J. CONNER & A. J. FULLER.
Nut-Locks.

No. 149,290.    Patented April 7, 1874.

Witnesses:
J. B. Connolly
E. Connolly

Inventors
Joseph Conner
Allen J. Fuller
By Connolly Bros Attys.

UNITED STATES PATENT OFFICE.

JOSEPH CONNER AND ALLEN J. FULLER, OF PHILADELPHIA, PA.

IMPROVEMENT IN NUT-LOCKS.

Specification forming part of Letters Patent No. 149,290, dated April 7, 1874; application filed June 26, 1873.

*To all whom it may concern:*

Be it known that we, JOSEPH CONNER and ALLEN J. FULLER, both of Philadelphia, in the county of Philadelphia and State of Pennsylvania, have invented a certain new and useful Nut-Lock; and we do hereby declare the following to be a full, clear, and exact description of the invention, such as will enable others skilled in the art to which it pertains to make and use it, reference being had to the accompanying drawings which form part of this specification, in which—

Figure 3:
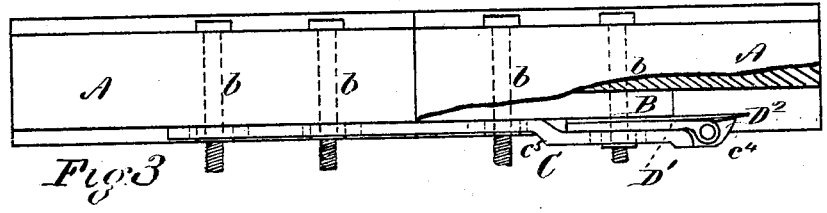
Figure 1:
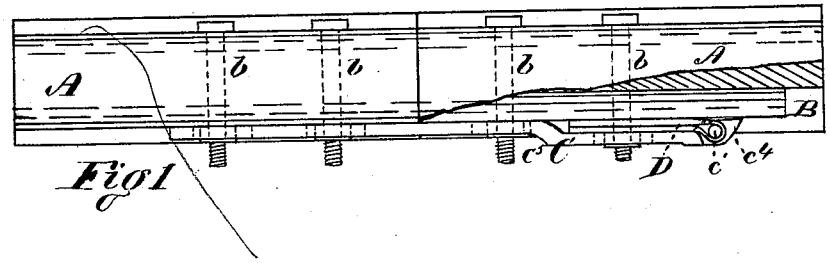
Figure 2:
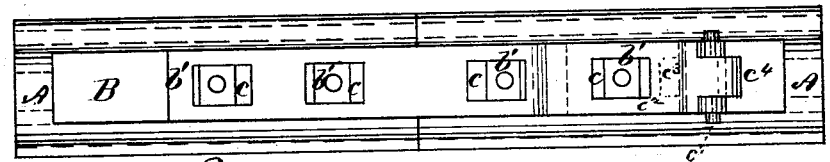
Figure 4:
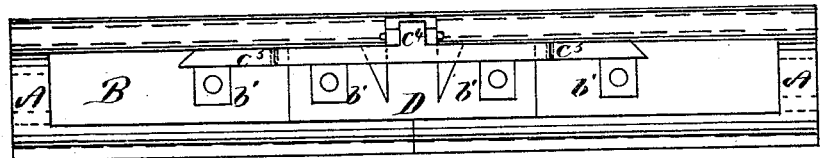

Figure 1 is a plan view of two connected railroad-rails with our improvement applied. Fig. 2 is a side view of the same. Figs. 3 and 4 are, respectively, plan and side views of modifications.

Our invention has for its object to provide a nut-lock which will be at all times kept securely in place, and not liable to become detached from the fish-plate, which will provide for the elongation and contraction of the distance between the nuts, owing to the shortening and lengthening of the rails, and which may be readily withdrawn to permit the adjustment of the nuts. The nature of our invention consists in the construction and combination of parts, as hereinafter fully described.

Referring to the accompanying drawing, A A are the ends of two rails, held together by the fish-plate B. The bolts passing through said rails and fish-plate are shown at $b\ b$, and $b'\ b'$ are the nuts thereon. C is the nut-lock, consisting of a flat plate with oblong openings $c\ c$, in which fit the nuts $b'\ b'$. D is a short piece of spring-steel firmly bolted or riveted at one end to the fish-plate, while its other end is jointed or hinged to the nut-locking plate, as shown, the pin $c^1$ passing through an eye formed by doubling over the plate of which the spring is formed. $c^2$ is an oblong opening, in which fits the nut on the bolt that secures the spring to the fish-plate, and $c^3$ is an elongated slot in the spring D, for the double purpose of receiving the cam projection or lug $c^4$ on the end of the lock, and causing the said spring D to bend more easily. On turning back the lock C the lug $c^4$ works against the fish-plate, raising the hinged end of the spring D. The lock may be turned until its back comes to the rail, and, on being restored to position over the nuts, it will be kept securely in place by the pressure of the spring.

The above construction may be modified, as shown in Fig. 3, in cases where the fish-plate is not long enough to permit the lug $c^4$ to work against it. In such case an inelastic metal plate, $D^1$, may be used, beneath which is placed a flat spring, $D^2$, which projects over the end of the fish-plate, as shown, and against which the lug $c^4$ works.

The construction may be further modified, still preserving the essential principle, as shown in Fig. 4, which is the form in which the lock should be made when hinged at the top or bottom, or upper and lower edge, instead of at the end, as shown in Figs. 1, 2, and 3. In this case the plate might be cut away so as to give a bearing on only one side of the nuts $b'\ b'$, which would, however, be sufficient to prevent their turning.

The lock C, it will be observed, is curved at $c^5$, so as to make room for the spring D, or equivalent plate, that part of it, however, which has the recesses for the nuts $b'\ b'$ being made flat, so as to lie closely against the fish-plate.

What we claim as our invention is—

The combination of the hinged plate C, having slots $c$ to embrace the nuts $b'$, and having also the projection or lug $c^4$, in combination with the spring D, or equivalent plate and spring, substantially as specified.

In testimony that we claim the foregoing, we have hereunto set our hands this 23d day of June, 1873.

ALLEN J. FULLER.
    JOSEPH CONNER.

Witnesses:
 WASHINGTON GARNER,
 CHAS. H. LUNGREN.